US012070764B2

(12) United States Patent
Gagne et al.

(10) Patent No.: US 12,070,764 B2
(45) Date of Patent: Aug. 27, 2024

(54) SYSTEM AND METHOD FOR DEFECT REPAIR

(71) Applicant: INOVISION SOFTWARE SOLUTIONS, INC., Chesterfield, MI (US)

(72) Inventors: Andrew Gary Gagne, Orion Township, MI (US); Kyle Lee Mantecon, Brighton, MI (US); Robert Paul Scipione, Jr., Madison Heights, MI (US)

(73) Assignee: INOVISION SOFTWARE SOLUTIONS, INC., Chesterfield, MI (US)

( * ) Notice: Subject to any disclaimer, the term of this patent is extended or adjusted under 35 U.S.C. 154(b) by 44 days.

(21) Appl. No.: 17/350,677

(22) Filed: Jun. 17, 2021

(65) Prior Publication Data

US 2021/0394218 A1 Dec. 23, 2021

Related U.S. Application Data

(60) Provisional application No. 63/040,121, filed on Jun. 17, 2020.

(51) Int. Cl.
*B05B 13/04* (2006.01)
*B05B 7/24* (2006.01)
(Continued)

(52) U.S. Cl.
CPC ........ *B05B 13/0431* (2013.01); *B05B 7/2491* (2013.01); *B25J 9/0093* (2013.01);
(Continued)

(58) Field of Classification Search
CPC ... B05B 12/122; B05B 12/18; B05B 13/0431; B05B 7/066; B05B 7/2491; B05B 7/267;
(Continued)

(56) References Cited

U.S. PATENT DOCUMENTS 3,416,340 A 12/1968 Reesor
4,476,981 A 10/1984 Yoshida
(Continued)

FOREIGN PATENT DOCUMENTS

CA 2684365 A1 10/2008
CN 109702764 A 5/2019
(Continued)

OTHER PUBLICATIONS

Instituto De Diseno Y Fabricacion Automocion 2013—Spain (A Brochure) and a website including the attached pages labelled "Ford Project" Authored By the Institute of Design and Manufacturing in 2013 and providing the brochure referenced above and located at www.institutoidf.com.
(Continued)

*Primary Examiner* — Alexander M Weddle
(74) *Attorney, Agent, or Firm* — Jacob M. Ward; Ward Law Office LLC

(57) ABSTRACT

A system for repairing a paint defect of a part can have means for identifying the paint defect of the part, a robotic applicator, and a computer module. The robotic applicator can include a dispenser and a pad. The robotic applicator can be configured to position the dispenser and the pad adjacent to the paint defect of the part. The dispenser can be configured to atomize a composition into an atomized composition. The dispenser can be also configured to dispose a predetermined amount of the atomized composition on the paint defect. The pad can be configured to work the predetermined amount of the atomized composition on the paint defect. The computer module can be in communication with the robotic applicator. The computer module can be configured to control functions of the robotic applicator.

19 Claims, 9 Drawing Sheets

(51) Int. Cl.
*B25J 9/00* (2006.01)
*B25J 11/00* (2006.01)
*G06T 7/00* (2017.01)

(52) U.S. Cl.
CPC ......... *B25J 11/0075* (2013.01); *G06T 7/0004* (2013.01); *G06T 2207/30156* (2013.01)

(58) Field of Classification Search
CPC .......... B05D 3/12; B05D 5/005; B24B 19/26; B24B 27/0023; B24B 27/0038; B24B 49/12; B24B 57/02; B25J 11/0075; B25J 9/0093; G06T 2207/30156; G06T 7/0004
See application file for complete search history.

(56) References Cited

U.S. PATENT DOCUMENTS

| | | | |
|---|---|---|---|
| 4,675,730 A | 6/1987 | Adomaitis et al. | |
| 4,678,920 A | 7/1987 | Iadipaolo et al. | |
| 5,022,190 A * | 6/1991 | Hutchins | B24B 55/02 451/450 |
| 5,087,822 A | 2/1992 | Fairlie et al. | |
| 5,090,804 A | 2/1992 | Wong et al. | |
| 5,216,481 A | 6/1993 | Minato | |
| 5,408,104 A | 4/1995 | Gorria et al. | |
| 5,642,198 A | 6/1997 | Long | |
| 5,726,705 A | 3/1998 | Imanishi et al. | |
| 5,734,742 A | 3/1998 | Asaeda et al. | |
| 5,844,801 A | 12/1998 | Kodama et al. | |
| 5,926,268 A | 7/1999 | Bonewitz et al. | |
| 6,239,436 B1 | 5/2001 | Parker et al. | |
| 6,266,138 B1 | 7/2001 | Keshavmurthy | |
| 6,278,517 B1 | 8/2001 | Willing | |
| 6,320,654 B1 | 11/2001 | Alders et al. | |
| 6,359,686 B1 | 3/2002 | Ariglio et al. | |
| 6,398,870 B1 | 6/2002 | Kaya et al. | |
| 6,462,813 B1 | 10/2002 | Haven et al. | |
| 6,496,219 B1 | 12/2002 | Porret et al. | |
| 6,509,964 B2 | 1/2003 | Wiles et al. | |
| 6,532,006 B1 | 3/2003 | Takekawa et al. | |
| 6,532,066 B1 | 3/2003 | Filev et al. | |
| 6,661,911 B1 | 12/2003 | Ishikura et al. | |
| 6,714,831 B2 | 3/2004 | Matthews et al. | |
| 6,804,386 B1 | 10/2004 | Nakayama et al. | |
| 7,019,826 B2 | 3/2006 | Vook et al. | |
| 7,020,580 B2 | 3/2006 | Peters et al. | |
| 7,105,848 B2 | 9/2006 | Guha et al. | |
| 7,171,037 B2 | 1/2007 | Mahon et al. | |
| 7,206,442 B1 | 4/2007 | Herod et al. | |
| 7,420,671 B2 | 9/2008 | Sonda | |
| 7,796,248 B2 | 9/2010 | Sonda | |
| 8,365,580 B2 | 2/2013 | Stumpf | |
| 8,922,641 B2 | 12/2014 | Bertin et al. | |
| 9,116,071 B2 | 8/2015 | Hatcher, Jr. et al. | |
| 9,438,864 B2 | 9/2016 | Swinford | |
| 9,709,463 B2 | 7/2017 | DeAscanis et al. | |
| 9,747,680 B2 | 8/2017 | Tai et al. | |
| 9,874,516 B2 | 1/2018 | Mann et al. | |
| 9,964,401 B2 | 5/2018 | Deschenes et al. | |
| 9,970,887 B2 | 5/2018 | Matsumoto | |
| 10,007,981 B2 | 6/2018 | Gangitano et al. | |
| 10,036,712 B2 | 7/2018 | Kuai et al. | |
| 10,063,758 B2 | 8/2018 | Scheich | |
| 10,082,470 B2 | 9/2018 | Shortt et al. | |
| 10,176,588 B2 | 1/2019 | Trenholm et al. | |
| 10,261,028 B2 | 4/2019 | Cilip et al. | |
| 10,281,029 B2 | 5/2019 | Pfeifer | |
| 10,462,444 B2 | 10/2019 | Wolke et al. | |
| 10,482,347 B2 | 11/2019 | Uffenkamp et al. | |
| 10,508,994 B2 | 12/2019 | Ando | |
| 10,508,995 B2 | 12/2019 | Mayumi | |
| 10,511,827 B2 | 12/2019 | Peeters et al. | |
| 10,520,449 B2 | 12/2019 | Piana | |
| 10,556,261 B2 | 2/2020 | Winchip et al. | |
| 10,560,634 B2 | 2/2020 | Ando | |
| 10,591,285 B2 | 3/2020 | Ando | |
| 10,596,754 B2 | 3/2020 | Williams et al. | |
| 10,666,927 B2 | 5/2020 | Bendall | |
| 10,934,023 B2 | 3/2021 | Li | |
| 2002/0024659 A1 | 2/2002 | Tanaka | |
| 2002/0101583 A1 | 8/2002 | Ariga | |
| 2002/0109112 A1 | 8/2002 | Guha et al. | |
| 2002/0110269 A1 | 8/2002 | Floeder et al. | |
| 2002/0141632 A1 | 10/2002 | Engelbart et al. | |
| 2003/0139836 A1* | 7/2003 | Matthews | G01N 21/8806 700/109 |
| 2006/0226380 A1 | 10/2006 | Koike et al. | |
| 2007/0115464 A1 | 5/2007 | Harding et al. | |
| 2008/0164316 A1 | 7/2008 | Patel et al. | |
| 2008/0310701 A1 | 12/2008 | Caroli et al. | |
| 2010/0182433 A1 | 7/2010 | Shimbo et al. | |
| 2012/0131766 A1 | 5/2012 | van Glabbeek et al. | |
| 2012/0262566 A1 | 10/2012 | Grzegorczyk et al. | |
| 2012/0327217 A1 | 12/2012 | Anayama et al. | |
| 2013/0011567 A1* | 1/2013 | Takebe | B05B 5/1633 239/106 |
| 2013/0057678 A1 | 3/2013 | Prior Carrillo et al. | |
| 2013/0343632 A1 | 12/2013 | Urano et al. | |
| 2014/0021260 A1 | 1/2014 | Cherry et al. | |
| 2014/0055604 A1 | 2/2014 | Delaney | |
| 2014/0193065 A1 | 7/2014 | Chu et al. | |
| 2014/0210997 A1 | 7/2014 | Blanchard et al. | |
| 2014/0341462 A1 | 11/2014 | Sezginer et al. | |
| 2014/0347446 A1 | 11/2014 | Frandsen, Jr. et al. | |
| 2015/0071523 A1 | 3/2015 | Herrmann et al. | |
| 2015/0116543 A1 | 4/2015 | Mitarai | |
| 2016/0110858 A1 | 4/2016 | Liu et al. | |
| 2017/0277979 A1 | 9/2017 | Allen et al. | |
| 2017/0346996 A1 | 11/2017 | Kida | |
| 2018/0283019 A1* | 10/2018 | Telleria | E04F 21/165 |
| 2018/0322623 A1 | 11/2018 | Memo et al. | |
| 2018/0326591 A1 | 11/2018 | Hausler | |
| 2019/0010357 A1* | 1/2019 | Kamada | C09K 3/14 |
| 2019/0070707 A1* | 3/2019 | Kamada | B24B 37/22 |
| 2019/0096057 A1 | 3/2019 | Allen et al. | |
| 2019/0321847 A1* | 10/2019 | Morizono | B05B 14/42 |
| 2020/0344449 A1 | 10/2020 | Allen et al. | |

FOREIGN PATENT DOCUMENTS

| | | | |
|---|---|---|---|
| DE | 4123916 A1 | 1/1992 | |
| EP | 0983853 A1 | 3/2000 | |
| EP | 0997201 B1 | 12/2005 | |
| GB | 2282444 B | 6/1997 | |
| JP | 59-90035 A | 5/1984 | |
| JP | 61-149814 A | 7/1986 | |
| JP | 7-209199 A | 8/1995 | |
| JP | 4583514 B2 | 11/2010 | |
| WO | 2008125702 A1 | 10/2008 | |
| WO | 2011144964 A1 | 11/2011 | |
| WO | WO-2018100799 A1 * | 6/2018 | ............. B05B 14/42 |
| WO | 2020044178 A1 | 3/2020 | |
| WO | WO-2021171132 A1 * | 9/2021 | ............. B24B 19/26 |

OTHER PUBLICATIONS

Nirbhar Neogi et al—Review of Vision—Based Steel Surface Inspection Systems-Article—Journal pf Image and Video Processing 2014, 2014:50 (http://jivp.eurasipjournals.com/contenU2014/1/50)—published in the Eurasip Journal on Image and Video Processing in 2014.

Muehlemann—Standardizing Defect Detection For The Surface Inspection of Large Web Steel—Article published by Illumination Technologies in 2000.

Leopoldo Armesto et al., Inspection System Based on Artificial Vision For Paint Defects on Car Bodies, IEEE International Conference on Robotics and Automation (ICRA), May of 2011, and found on www.iIeeexplore.ieee.org.

Leopoldo Armesto, Quality Control of Car-Bodies Based on Artificial Vision, European Automotive Congress, June of 2011.

(56) References Cited

OTHER PUBLICATIONS

ICEMI S.L., Training Manual—Automated Inspection System (AIS) Dirt In Paint (DIP)—Training Manual—May of 2013 and given to and used by Ford Motor Company, for example, in the Ford Kentucky Plant.

Andreas Hahn et al., Defect Classification on Specular Surfaces Using Wavelets, Article, 2013, Springer-Verlag Berlin, Heidelberg, 2013.

Tan-Toan Le, Mathias Ziebarth, Thomas Greiner, Michael Heizmann, Inspecton of Specular Surfaces Using Optimized M-Channel Wavelets, Article, International Conference on Acoustics, Speech, and Signal Processing, May 26-31, 2013 ICASSP 2013.

Soren Kammel and Fernando Puente Leon, Deflectometric Measurement of Specular Surfaces, 2008, Article, IEEE Transactions on Instrumentation and Measurement, vol. 57, No. 4. Apr. 2008.

Th. Laengle, D. Paul, M. Hartrumpf, and G. Struck, Image Fusion for Automatic Inspection of Moving Surfaces, Article, 2006, IEEE International Conference on Mul Tisensor Fusion and Integration for Intelligent Systems, Sep. 3-6, Heidelberg, Germany 2006.

David H. EBERLY-"3D Game Engine Design—A Practical Approach To Real-Time Computer Graphics" second edition—Book—Morgan Kaufmann Publishers—500 Sansome Street—Suite 400—San Francisco, California 94111. Section 3.4.3 Clipping, pp. 93-99 and Section 3.7.2 Clipping a Triangle Mesh, pp. 133-137.

Frank D. Luna- "Introduction To 3D Game Programming With DirectX &11", book, Mercury Learning and Information, LLC, 22841 Quicksilver Drive, Dulles, VA 20166, 2012-ISBN 978-1-9364202-2-3 .—Library of Congress Control No. 20122931119. Section 21.3 Projective Texture Coordinates, pp. 669-673, and Chapter 10 Stenciling, pp. 371-397.

Written Opinion of the International Search Authority dated Sep. 30, 2021.

* cited by examiner

| Dispense Pressure (psi) | Trial | Mass Before (g) | Mass After (g) | Mass of Polish (g) | Density (g/cm^3) | Volume Dispensed (cm^3) | Average Dispensed (cm^3) | Standard Deviation (cm^3) |
|---|---|---|---|---|---|---|---|---|
| 80 | 1 | 1.4798 | 2.0207 | 0.5409 | 1.08 | 0.5008 | 0.5031 | 0.0112 |
| | 2 | 1.4927 | 2.0374 | 0.5447 | | 0.5044 | | |
| | 3 | 1.5233 | 2.0883 | 0.565 | | 0.5231 | | |
| | 4 | 1.539 | 2.0762 | 0.5372 | | 0.4974 | | |
| | 5 | 1.4128 | 1.9375 | 0.5247 | | 0.4858 | | |
| | 6 | 1.4657 | 2.001 | 0.5353 | | 0.4956 | | |
| | 7 | 1.5236 | 2.0702 | 0.5466 | | 0.5061 | | |
| | 8 | 1.5784 | 2.119 | 0.5406 | | 0.5006 | | |
| | 9 | 1.5855 | 2.1471 | 0.5616 | | 0.52 | | |
| | 10 | 1.5699 | 2.1069 | 0.537 | | 0.4972 | | |
| 90 | 1 | 1.675 | 2.5193 | 0.8443 | | 0.7818 | 0.7979 | 0.0216 |
| | 2 | 1.8965 | 2.7302 | 0.8337 | | 0.7719 | | |
| | 3 | 1.5825 | 2.447 | 0.8645 | | 0.8005 | | |
| | 4 | 1.3989 | 2.273 | 0.8741 | | 0.8094 | | |
| | 5 | 1.5168 | 2.4089 | 0.8921 | | 0.826 | | |
| 100 | 1 | 1.5745 | 2.7524 | 1.1779 | | 1.0906 | 1.1056 | 0.0556 |
| | 2 | 1.7129 | 2.8091 | 1.0962 | | 1.015 | | |
| | 3 | 1.6192 | 2.8412 | 1.222 | | 1.1315 | | |
| | 4 | 1.6397 | 2.8705 | 1.2308 | | 1.1396 | | |
| | 5 | 1.3572 | 2.6006 | 1.2434 | | 1.1513 | | |

FIG. 11

SYSTEM AND METHOD FOR DEFECT REPAIR

CROSS-REFERENCE TO RELATED APPLICATIONS

This application claims the benefit of U.S. Provisional Application Ser. No. 63/040,121, filed on Jun. 17, 2020. The entire disclosure of the above application is incorporated herein by reference.

FIELD

The present disclosure relates to quality control, and more particularly, to paint defect repair.

INTRODUCTION

This section provides background information related to the present disclosure which is not necessarily prior art.

Paint repair is one of the last remaining steps in the vehicle manufacturing process that is still predominantly done as a manual process. Undesirably, the painting process in a manufacturing environment can often yield paint defects that can occur on the surface of the part being painted. These imperfections can be caused by dirt, craters, fibers, or other contaminants in the paint, air, or present on the part. These defects in the finish of the surface of the painted part is undesirable for the finished manufactured product.

In particular, paint defects can create a bump on a relatively flat surface of a part. These bumps are often repaired manually using a paint finesse process, such as the 3M Finesse-It™ System. These processes typically involve sanding the bump to flatten the surface and then polishing the sanded area to remove the scratch marks created by the sanding step. The polishing process can use a polish and a random orbital polishing tool. The polish can be applied to the area and then the area can be polished using the random orbital polishing tool with a buffing pad. The polishing process is accomplished by manually squeezing a compound from a tube to create a pea-sized drop of the compound on the sanded area. Undesirably, this can result in inconsistent amounts of the compound being applied, as well as inconsistent application areas, which can be due in part to human error.

These types of repair processes may not be efficient for use in automated paint defect detection and repair systems. For instance, the system can dispose too much of the polish onto the paint defect, which can result in wasted resources. In addition, if too much of the polish is used, the buffing pad can fling the excess polish to adjacent non-defective surfaces. This can require time-consuming and labor-intensive cleanup for those adjacent surfaces. These problems can also reduce the efficiency in an automated system as they can result in an incomplete or ineffective repair cycle, or require additional clean-up actions, which can slow down the overall process.

There is a continuing need for a system and method for repairing a paint defect of a part. Desirably, the system and method can apply a controlled and repeatable amount of material to militate against wasted material and regulate application of such material to a predetermined and limited area.

SUMMARY

In concordance with the instant disclosure, a system and method for repairing a paint defect of a part, and which can apply a controlled and repeatable amount of a composition to militate against wasted material, has been surprisingly discovered. The present technology, as detailed throughout the description and figures provided herewith, is demonstrated with respect to paint defect repair, but one skilled in the art recognizes the possibility of other applications relating to other types of quality control, including attending to and correcting other types of part and surface defects. Examples include pre- and post-paint operations, including surface sanding, cleaning, sealing, etc.

In certain embodiments, systems for repairing a paint defect of a part can have means for identifying the paint defect of the part, a robotic applicator, and a computer module. The robotic applicator can include a dispenser and an end effector with a pad. The robotic applicator can be configured to position the dispenser and the pad adjacent to the paint defect of the part. The dispenser can be configured to atomize a composition into an atomized composition. The dispenser can be also configured to dispose a predetermined amount of the atomized composition on the paint defect. The end effector configured to control motion of the pad. The end effector can be also configured to work the predetermined amount of the atomized composition on the paint defect with the pad. The computer module can be in communication with the robotic applicator. The computer module can be configured to control functions of the robotic applicator.

In certain embodiments, methods for repairing the paint defect of the part can include a step of providing the system for repairing the paint defect of the part. The means can identify the paint defect of the part. The robotic applicator can position the dispenser and the pad adjacent to the paint defect of the part. The dispenser can atomize the composition into the atomized composition. The dispenser can dispose the predetermined amount of the atomized composition on the paint defect. The end effector can work the predetermined amount of the atomized composition on the paint defect with the pad, thereby repairing the paint defect of the part.

Further areas of applicability will become apparent from the description provided herein. It should be understood that the description and specific examples are intended for purposes of illustration only and are not intended to limit the scope of the present disclosure.

DRAWINGS

The above, as well as other advantages of the present disclosure, will become readily apparent to those skilled in the art from the following detailed description, particularly when considered in the light of the drawings described herein.

FIG. 11 is a table showing trials of a system constructed in accordance with the present technology to determine a volume of composition dispensed when a dispense pressure was varied.

DETAILED DESCRIPTION

Figure 1:
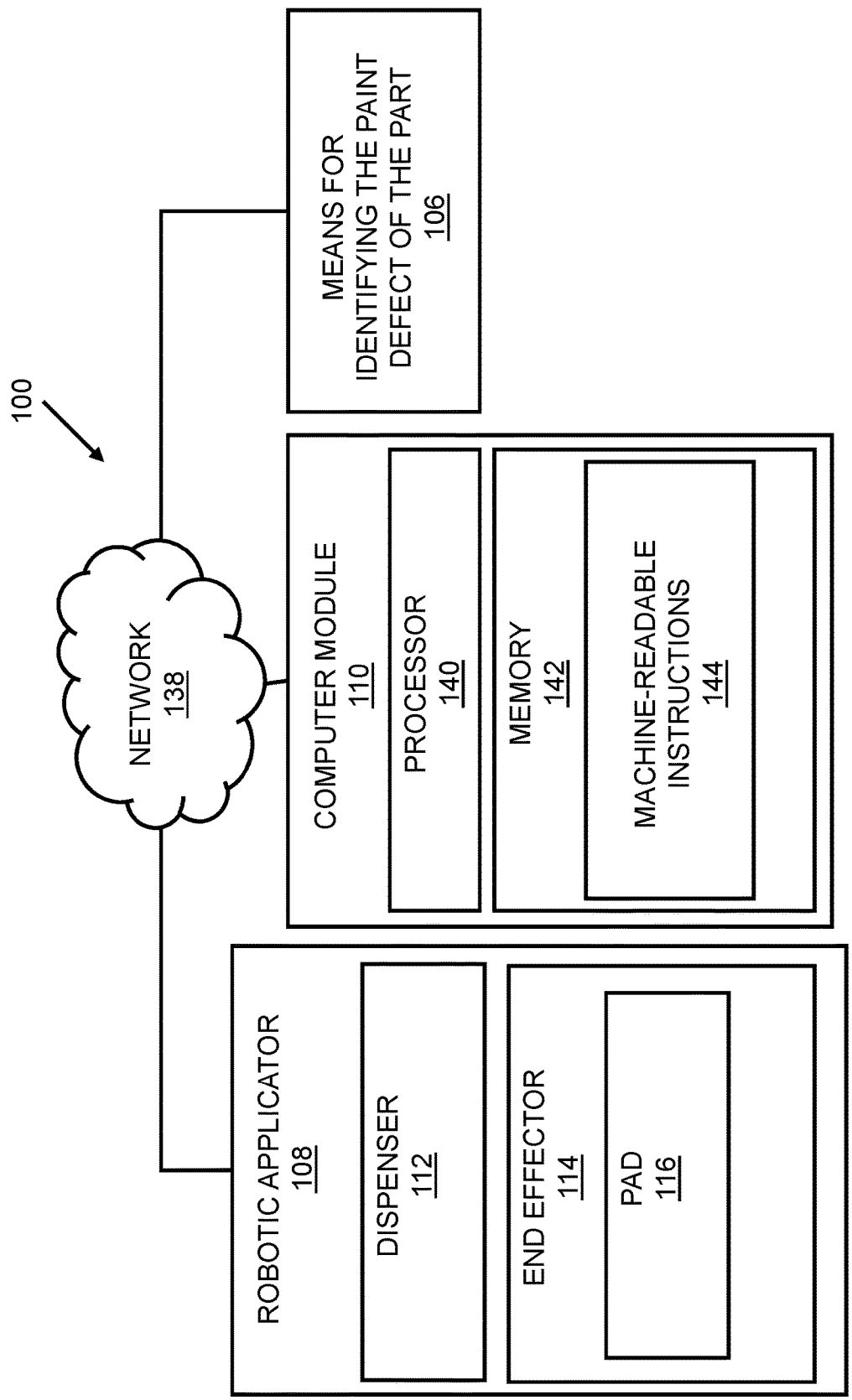
FIG. 1 is a schematic view of a system for repairing a paint defect of a part according to certain embodiments, including means for identifying the paint defect of the part, a robotic applicator, and a computer module.

The following description of technology is merely exemplary in nature of the subject matter, manufacture, and use of one or more inventions, and is not intended to limit the scope, application, or uses of any specific invention claimed in this application or in such other applications as can be filed claiming priority to this application, or patents issuing therefrom. Regarding methods disclosed, the order of the steps presented is exemplary in nature, and thus, the order of the steps can be different in various embodiments, including where certain steps can be simultaneously performed.

The terms "a" and "an" as used herein indicate "at least one" of the item is present; a plurality of such items can be present, when possible. Except where otherwise expressly indicated, all numerical quantities in this description are to be understood as modified by the word "about" and all geometric and spatial descriptors are to be understood as modified by the word "substantially" in describing the broadest scope of the technology. The term "about" when applied to numerical values indicates that the calculation or the measurement allows some slight imprecision in the value (with some approach to exactness in the value; approximately or reasonably close to the value; nearly). If, for some reason, the imprecision provided by "about" and/or "substantially" is not otherwise understood in the art with this ordinary meaning, then "about" and/or "substantially" as used herein indicates at least variations that can arise from ordinary methods of measuring or using such parameters.

Although the open-ended term "comprising," as a synonym of non-restrictive terms such as including, containing, or having, is used herein to describe and claim embodiments of the present technology, embodiments can alternatively be described using more limiting terms such as "consisting of" or "consisting essentially of." Thus, for any given embodiment reciting materials, components, or process steps, the present technology also specifically includes embodiments consisting of, or consisting essentially of, such materials, components, or process steps excluding additional materials, components or processes (for consisting of) and excluding additional materials, components or processes affecting the significant properties of the embodiment (for consisting essentially of), even though such additional materials, components or processes are not explicitly recited in this application.

Disclosures of ranges are, unless specified otherwise, inclusive of endpoints and include all distinct values and further divided ranges within the entire range. Thus, for example, a range of "from A to B" or "from about A to about B" is inclusive of A and of B. Disclosure of values and ranges of values for specific parameters (such as amounts, weight percentages, etc.) are not exclusive of other values and ranges of values useful herein. It is envisioned that two or more specific exemplified values for a given parameter can define endpoints for a range of values that can be claimed for the parameter. For example, if Parameter X is exemplified herein to have value A and also exemplified to have value Z, it is envisioned that Parameter X can have a range of values from about A to about Z. Similarly, it is envisioned that disclosure of two or more ranges of values for a parameter (whether such ranges are nested, overlapping, or distinct) subsume all possible combination of ranges for the value that might be claimed using endpoints of the disclosed ranges. For example, if Parameter X is exemplified herein to have values in the range of 1-10, or 2-9, or 3-8, it is also envisioned that Parameter X can have other ranges of values including 1-9, 1-8, 1-3, 1-2, 2-10, 2-8, 2-3, 3-10, 3-9, and so on.

When an element or layer is referred to as being "on," "engaged to," "connected to," or "coupled to" another element or layer, it can be directly on, engaged, connected, or coupled to the other element or layer, or intervening elements or layers can be present. In contrast, when an element is referred to as being "directly on," "directly engaged to," "directly connected to" or "directly coupled to" another element or layer, there can be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. can be used herein to describe various elements, components, regions, layers and/or sections, these elements, components, regions, layers and/or sections should not be limited by these terms. These terms can be only used to distinguish one element, component, region, layer or section from another region, layer, or section. Terms such as "first," "second," and other numerical terms when used herein do not imply a sequence or order unless clearly indicated by the context. Thus, a first element, component, region, layer, or section discussed below could be termed a second element, component, region, layer, or section without departing from the teachings of the example embodiments.

Spatially relative terms, such as "inner," "outer," "beneath," "below," "lower," "above," "upper," and the like, can be used herein for ease of description to describe one element or feature's relationship to another element(s) or feature(s) as illustrated in the figures. Spatially relative terms can be intended to encompass different orientations of the device in use or operation in addition to the orientation depicted in the figures. For example, if the device in the figures is turned over, elements described as "below", or "beneath" other elements or features would then be oriented "above" the other elements or features. Thus, the example term "below" can encompass both an orientation of above and below. The device can be otherwise oriented (rotated 90 degrees or at other orientations) and the spatially relative descriptors used herein interpreted accordingly.

All documents, including patents, patent applications, and scientific literature cited in this detailed description are incorporated herein by reference, unless otherwise expressly indicated. Where any conflict or ambiguity can exist between a document incorporated by reference and this detailed description, the present detailed description controls.

With reference to FIGS. 1-7, a system 100 for repairing a part 102 is shown, in particular, where the part 102 has a paint defect 104. The part 102 can include a broad range of different components that have at least one layer of paint and/or finish applied during a manufacturing process. Non-limiting examples of the part 102 can include various painted parts 102 for various vehicles (e.g., automobiles, trucks, trains, boats, airplanes, and helicopters) and various consumer goods (e.g., appliances, electronic devices, furniture, building materials). The layer of paint can also include a layer of e-coat, filler, primer, and/or clear coat. It should be appreciated that a skilled artisan can select different parts 102 and/or layers of paint to be used with the system 100, as desired.

Figure 3:
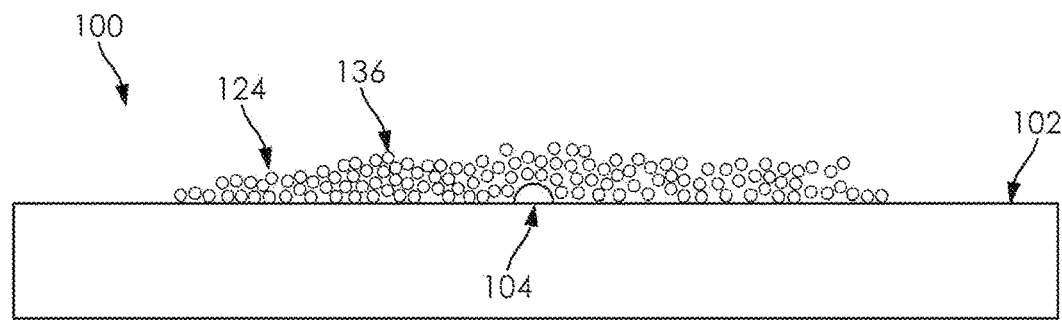
FIG. 3 is a side elevational view of the part, according to certain embodiments, showing a plurality of resultant droplets, defining the predetermined amount of the atomized composition, disposed on the paint defect.
Figure 4:
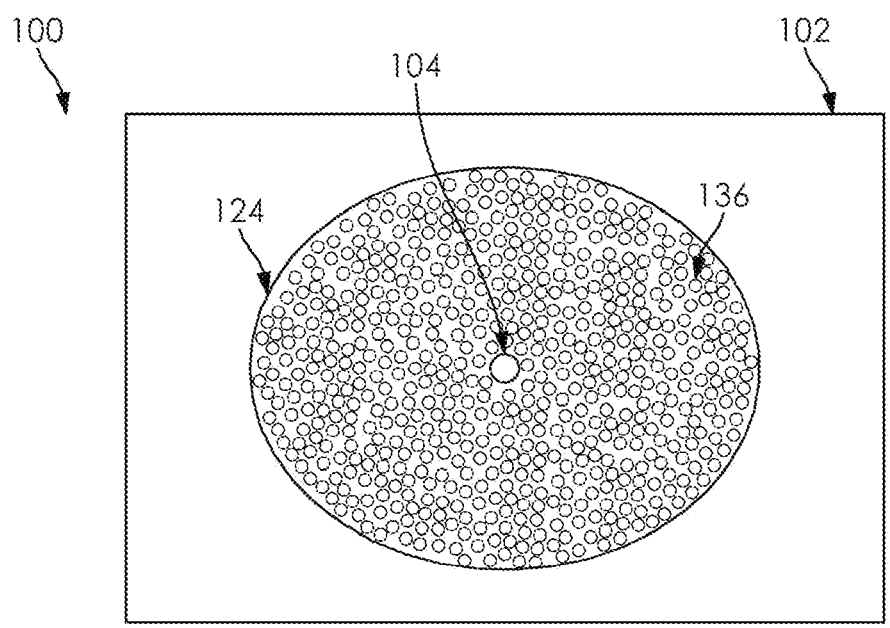
FIG. 4 is a top plan view of the part, shown in FIG. 3, showing the plurality of resultant droplets surrounding the paint defect of the part and applied in the predetermined location.
Figure 5:
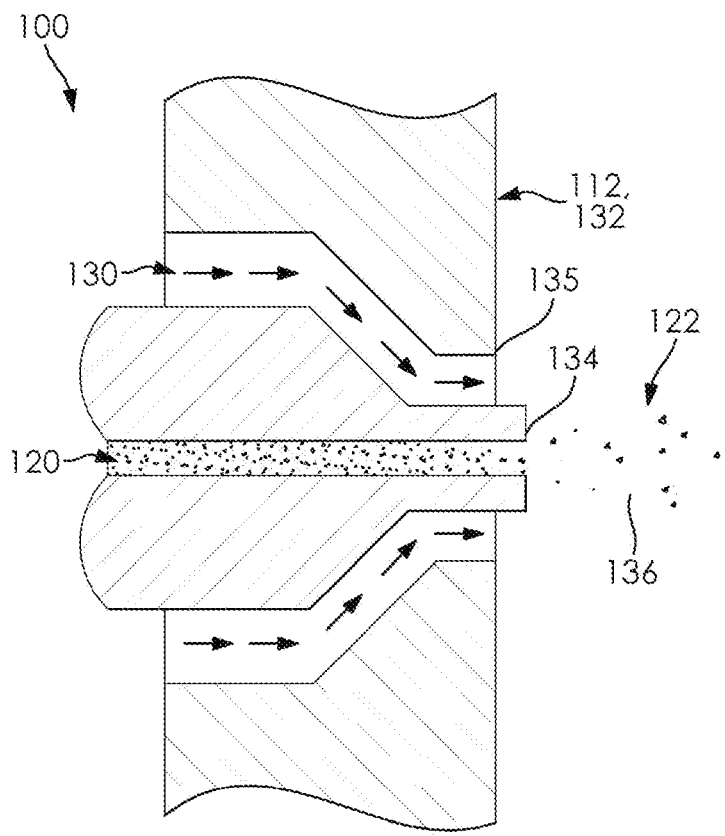
FIG. 5 is a sectional view of a non-limiting example of the dispenser, showing gas traveling through a gas outlet and a composition traveling through a composition outlet, and further showing the composition being atomized by the gas into the atomized composition.

Now referring to FIGS. 3-4, the paint defect 104 can broadly refer to an area on the part 102 that interrupts a visual aesthetic. For example, the paint defect 104 can include debris trapped under the layer of paint, smudges in the layer of paint, excess paint, such as smears or dripping, dents, contaminants in the paint, and/or scratches in the layer of paint. However, it should be appreciated that one skilled in the art can select different types of defects to be included in the paint defect 104, within the scope of this disclosure. In addition, it should be appreciated that there can be multiple paint defects 104 on the part 102.

Figure 7:
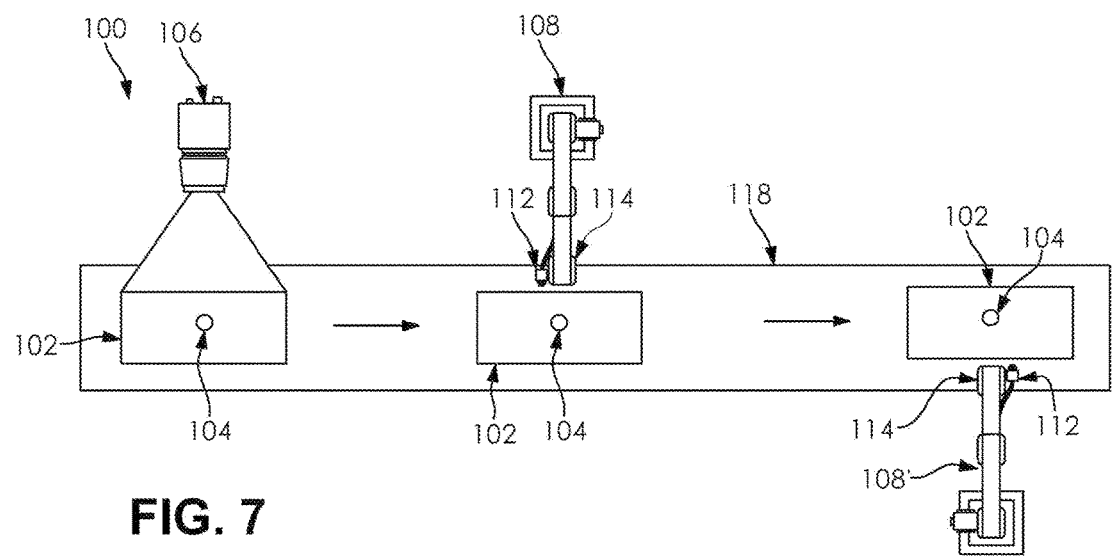
FIG. 7 is a top plan view of the system, according to certain embodiments, showing a part traveling along an assembly line having multiple stations, where the stations include the means for identifying the paint defect of the part, the robotic applicator, and a second robotic applicator.

As shown in FIG. 7, the system 100 can have a means for identifying the paint defect 106, a robotic applicator 108, and a computer module 110. The means for identifying the paint defect 106 can include various types of identifying technologies and techniques. In certain embodiments, the means for identifying the paint defect 106 can include an object inspection system and method, as described in U.S. patent application Ser. No. 15/932,865 to Allen et al. and/or the associated continuation application, U.S. patent application Ser. No. 16/866,110 to Allen et al. The object inspection system can be configured to identify the paint defect 104 by measuring perturbations in light reflected off the paint defect 104 of the part 102. In another non-limiting example, the means for identifying the paint defect 106 can include a system and method for detecting texture differences across different portions of the part 102. Further non-limiting examples can include a worker manually identifying one or more paint defects 104 as well as using one or more machine vision (MV) cameras to identify the paint defect(s) 104. The MV cameras can include conventional (2D visible) light imaging, multispectral imaging, hyperspectral imaging, imaging various infrared bands, line scan imaging, 3D imaging of surfaces and/or X-ray imaging. It should be appreciated that a person skilled in the art can employ different technologies and methods for the means for identifying the paint defect 106, based on the needs for the given application.

Figure 2:
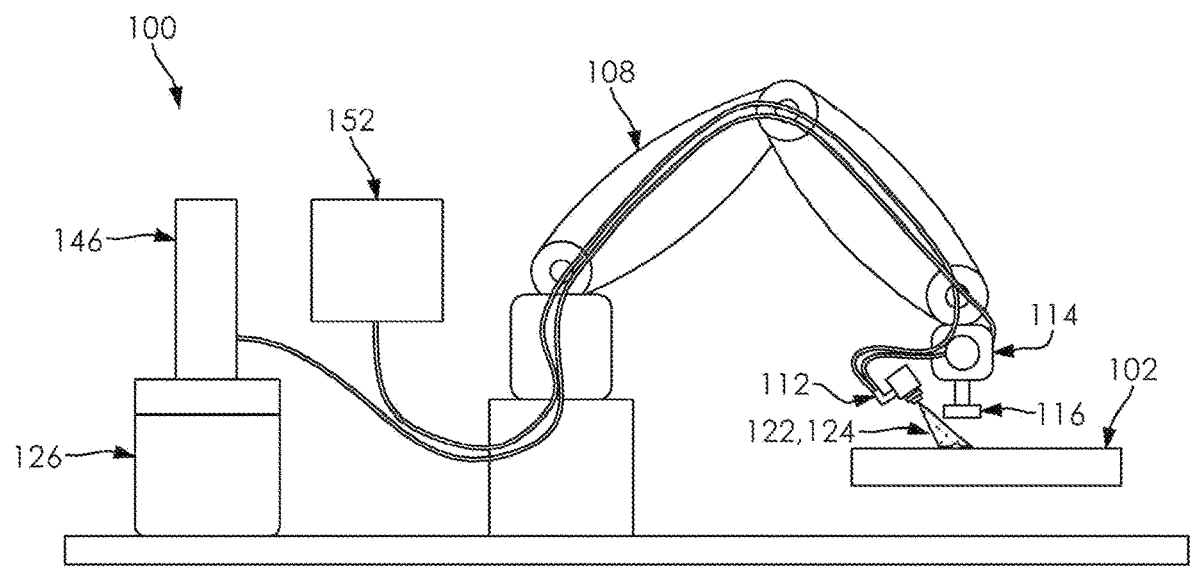
FIG. 2 is a schematic side elevational view of the system for repairing a paint defect of a part according to certain embodiments, showing the robotic applicator in the form of a multi-axis robot having a dispenser and a pad, and further showing the dispenser disposing a predetermined amount of atomized composition on part at a predetermined location.

With reference to FIGS. 2 and 7, the robotic applicator 108 can be configured to move about at least one axis and can include various articulated robots, including six axis robots. Desirably, this can permit the robotic applicator 108 to move to reach the paint defect 104 of the part 102 based upon various positions and surface contours of the part 102 as well as various approaches to the part 102. A non-limiting example of the robotic applicator 108 can include a FANUC™ robot sold by the FANUC America Corporation. However, it should be appreciated that other types of robots can be selected for the robotic applicator 108, within the scope of this disclosure. In certain examples, the robotic applicator 108 can move about at least three axes. Advantageously, this can permit the robotic applicator 108 to reach the paint defect 104 of the part 102, regardless of the orientation of the part 102 (e.g., if the part 102 is hung vertically or horizontally).

In other embodiments, the robotic applicator 108 can be in communication with the means for identifying the paint defect 106 of the part 102. Desirably, this can allow the means for identifying the paint defect 106 of the part 102 to direct the movements of the robotic applicator 108 to the paint defect 104 of the part 102.

While still referring to FIGS. 2 and 7, the robotic applicator 108 can have a dispenser 112 and an end effector 114 with a pad 116. The robotic applicator 108 can be configured to position the dispenser 112 and the pad 116 adjacent to the paint defect 104 of the part 102, as shown in FIG. 2. In some instances, the part 102 can be continuously moving while the paint defect 104 is being repaired by the system 100 (shown in FIG. 7). For example, the part 102 can be moved by an assembly or production line 118. The robotic applicator 108 can be configured to maintain the dispenser 112 and the pad 116 adjacent to the paint defect 104 of the part 102, while the part 102 is being moved on the assembly or production line 118. Desirably, this can permit the system 100 to repair the paint defect 104 without having a substantial pause during the repair process. In other instances, the assembly or production line 118 can pause momentarily adject to the robotic application to permit the system 100 to repair the paint defect 104 of the part 102.

Now referencing FIG. 7, once the dispenser 112 is moved adjacent to the paint defect 104 of the part 102, the dispenser 112 can be configured to atomize a composition 120 into an atomized composition 122, and then dispose a predetermined amount 124 of the atomized composition 122 on the paint defect 104 of the part 102 in a predetermined location. The composition 120 can include a dispersion, a paste, particles, grit, a solution, and/or mixture that can aid in repairing the paint defect 104. For example, in some instances, the composition 120 can include a sanding composition. A non-limiting example of the sanding composition can be a water-based composition. In certain examples, the sanding composition can include an abrasive and/or grit to aid in sanding the paint defect 104. Advantageously, the sanding composition can function as lubrication and/or an abrasive during a sanding process, such as a wet sanding process. It should be appreciated that different compositions can be employed for the sanding composition, such as a slurry, to aid in the sanding process. Certain embodiments include where the composition can include water and the pad 116 can include an abrasive having a particular grit value. For example, the composition 120 can include an aqueous composition and the pad 116 can include a sanding disc or sandpaper of a desired grit value. The dispenser 112 and the end effector 114 having the pad 116 can therefore be configured to perform certain wet sanding operations.

In other instances, the composition 120 can include a polishing composition. The polishing composition can include an abrasive and/or grit to facilitate in polishing the paint defect 104. Desirably, the polishing composition can used during a polishing or buffering operation. Non-limiting examples of the polishing composition can include petroleum distillates, hydrotreated light petroleum distillates, solvent refined hydrotreated middle distillate, or other petroleum distillates, aluminum oxide mineral, glycerin, and mineral oil. In certain examples, the polishing composition can include polishing compositions commercially available from 3M, including 3M Finesse-It™ products with the following part numbers: 06002, 28695, 28696, 51056, and/or 82878. However, it should be appreciated that a skilled artisan can select different polishes for the polishing composition, as desired. In addition, it should be appreciated that different types of compositions can be selected for the composition, within the scope of this disclosure. Certain embodiments include where the composition can include a polishing composition and the pad 116 can include a polishing pad of various woven, nonwoven, bristled, foamed, and/or microfiber materials. For example, the composition 120 can include a polishing composition having a polishing compound, wax, and/or sealant and the pad 116 can include a polishing disc configured to hold and work the polishing composition on the paint defect 104. The dispenser 112 and the end effector 114 having the pad 116 can therefore be configured to perform certain polishing operations.

Figure 6:
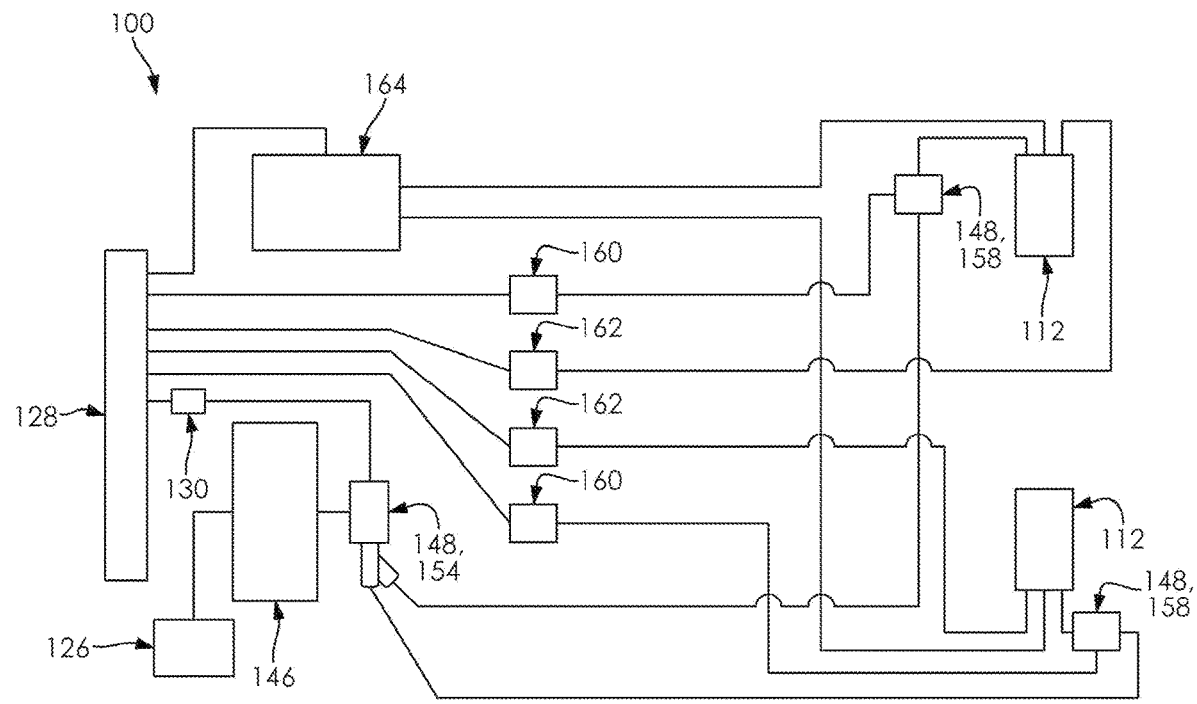
FIG. 6 is a schematic view of the system, according to certain embodiments, showing a gas supply, a fluid supply, a pump, at least one composition regulator, a gas regulator, a dispenser control module, and the dispenser along with another dispenser.

With reference to FIG. 6, the dispenser 112 can be in communication with a composition supply 126 and a gas supply 128. The composition supply 126 can be configured to supply the composition 120 to the dispenser 112 to be atomized. The gas supply 128 can be configured to supply gas 130 to the dispenser 112 to assist in atomizing the composition 120. The dispenser 112 can include a nozzle 132. Now referencing FIG. 5, the nozzle 132 can have at least one composition outlet 134 and at least one gas outlet 135. The composition outlet 134 can be adjacent to the gas outlet 135. The nozzle 132 can be configured to focus the gas 130 through the gas outlet 135 and the composition 120 through the composition outlet 134. While still referring to FIG. 5, in operation, as the composition 120 exits the composition outlet 134 and the gas 130 exits the gas outlet 135, the gas 130 contacts the composition 120 and forms a friction force. The friction force can accelerate and disrupt the composition 120, which can atomize (or separate) the composition 120 into an atomized composition 122 defined by a plurality of resultant droplets 136. In other words, the gas 130 atomizes the composition 120 into the atomized composition 122, as it exits the dispenser 112. It should be appreciated that a skilled artisan can select other methods and technologies for atomizing the composition 120, within the scope of this disclosure.

In certain embodiments, the nozzle 132 can have a conical spray tip to form a round composition pattern for the atomized composition 122. Advantageously, it is believed that this can facilitate disposing the atomized composition 122 on the paint defect 104, while militating against the atomized composition 122 from being disposed on the non-defective areas of the part 102. A non-limiting example of the dispenser 112 can include a low volume (LV) spray nozzle, such as the LV spray nozzle commercially available from UNIST™, including the 4210 series. Desirably, the LV spray nozzle can provide a consistent and controlled spray pattern, which can militate against the atomized composition 122 from being disposed on the non-defective areas of the part 102 and can allow a predetermined amount 124 of the atomized composition 122 to be applied in the predetermined location on the part 102. However, it should be appreciated that a skilled artisan can employ different types of technologies for the dispenser 112, within the scope of this disclosure.

Each of the resultant droplets 136 of the atomized composition 122 can exhibit an adhesive force when in contact with the part 102 that can substantially reduce subsequent movement of the resultant droplets 136. In particular, the dispenser 112 can be configured to atomize the composition 120 into the atomized composition 122 such that an adhesive force of the atomized composition 122 on the paint defect 104 is substantially greater than gravity, thereby minimizing movement of the atomized composition 122 on the paint defect 104. In other words, the resultant droplets 136 can substantially adhere to the paint defect 104, while militating against running and/or dripping down the non-defective areas of the part 102. Desirably, this can militate against damaging the non-defective areas of the part 102 from the resultant droplets 136 running or dripping onto the non-defective areas of the part 102. In addition, the resultant droplets 136 adhering to the paint defect 104 can permit the part 102 to be positioned in different orientations. For example, the part 102 can be hung vertically, without having to deal with a substantial amount of the resultant droplets 136 from running and/or dripping down the non-defective area of the part 102. Advantageously, this can facilitate use in the context of an assembly or production line 118 that may not require the part 102 to be oriented in a particular position in order to receive the predetermined amount 124 of the atomized composition 122.

In a specific example, an atomized sanding composition can provide the resultant droplets 136 wherein the size each of the resultant droplets 136 can range from about ten microns to five hundred microns, more specifically from about fifty microns to three hundred microns, and most specifically about one hundred microns. An atomized polishing composition can provide resultant droplets 136 wherein each of the resultant droplets 136 can have a size ranging from about ten microns to five hundred microns, more specifically from about fifty microns to three hundred microns, and most specifically about one hundred and fifty microns. Although these sizes of the resultant droplets 136 have been shown to be useful, it should be appreciated that a skilled artisan can scale the size of each of the resultant droplets 136 based on properties of the composition 120 being disposed from the dispenser 112, among other factors.

As shown in FIGS. 3-4, the predetermined amount 124 of the atomized composition 122 can be the amount of the atomized composition 122 that is needed to properly repair the paint defect 104. In certain examples, the predetermined amount 124 can be a controlled and repeatable amount that only substantially covers the paint defect 104. Desirably, this can militate against having too much atomized composition 122 disposed on the paint defect 104, which can result in excess composition remaining or being flung to non-defective areas of the part 102 during the sanding and/or the polishing processes. Additionally, the predetermined amount 124 can permit for greater control of the amount of composition 120 being dispensed, which is advantageous as both excess and lack of fluid can have a negative effect on the work output of the end effector 114. For example, if too much of an atomized sanding composition is applied during a sanding process, the sanding pad can hydroplane and eliminate the abrasiveness of the sanding pad. In addition, if too much of the atomized polishing composition is applied during the polishing process, the polishing pad can be worn down faster, become overly saturated, and hence not perform in an optimal fashion. Undesirably, this can result in the life of the polishing pad being diminished.

In a non-limiting example, the predetermined amount 124 can have a volumetric size. The volumetric size of the predetermined amount 124 can range from about 0.1 milliliter to 1.5 milliliter, more particularly from about 0.5 milliliter to 1.0 milliliter, and most particularly about 0.7 milliliter. Although these ranges for volumetric size of the predetermined amount 124 of atomized composition 122 have shown to be useful, a person skilled in the art can select other dimensions for the volumetric size, as desired.

It should be appreciated that the composition 120 can be a low viscosity composition. The low viscosity composition can provide better consistency of the spray pattern and can facilitate forming the atomized composition 122. In certain examples, the low viscosity composition can range from a viscosity of less than 80,000 cp to about 1 cp. It should be appreciated the viscosity can be scaled by a skilled artisan, as desired.

With reference to FIGS. 2 and 7, the end effector 114 can be configured to control the motion of the pad 116. Non-limiting examples of the motion can include spinning and rotating the pad 116, as well controlling a reciprocating motion of the pad 116. In particular, the end effector 114 can be configured to work the predetermined amount 124 of the atomized composition 122 on the paint defect 104 of the part 102 with the pad 116. Desirably, this can work the predetermined amount 124 of the atomized composition 122 on, over, around, and/or about the paint defect 104 to repair the paint defect 104. The pad 116 can have a pad surface area and the predetermined amount 124 of the atomized composition 122 can have an applied composition surface area, such as a predetermined application area of the atomized composition 122. In certain examples, the pad surface area can be greater than or equal to the applied composition surface area. Advantageously, this can allow the pad 116 to correspond to the predetermined amount 124 of the atomized composition 122, which can militate against the pad 116 contacting non-defective areas of the part 102 and prevent application of the atomized composition 122 to areas of the part 102 that are not in need thereof.

In certain embodiments, the pad 116 can include a sanding pad, and working the predetermined amount 124 of the atomized composition 122 on the paint defect 104 of the part 102 can include sanding the paint defect 104 with the sanding pad and the atomized composition 122. Advantageously, this can allow repairing the paint defect 104 where the paint defect 104 includes at least one of debris trapped within one or more layers of paint disposed on the part 102, smudges in the paint, excess paint, paint dripping, and/or dents. Although it should be appreciated that other defects, which can be cured by sanding, can also be handled by the sanding pad and the atomized composition 122. In addition, it should be appreciated that the sanding pad can have an abrasive and/or grit to aid in sanding the paint defect 104.

Now referring to FIG. 7, in operation with the sanding pad, the end effector 114 can sand the paint defect 104 of the part 102 with the sanding pad and the atomized composition 122 to strip the layer of paint down to a non-defective substrate, thereby repairing the paint defect 104 of the part 102. Sanding can include rotating, rubbing, oscillating, and/or vibrating the sanding pad with the atomized composition 122 against the paint defect 104 of the part 102. In instances, where the composition 120 is a sanding composition, the sanding process can result in the formation of a slurry. The slurry can facilitate stripping the layer of paint down to a non-defective substrate. Non-limiting examples of the sanding pad can include a sanding block, an orbital sander, a belt sanding, an edging sander, a drum sander, a random orbital sander, an oscillating spindle sander, a file sander, a detail sander, and/or sandpaper. It should be appreciated that one skilled in the art can employ different technologies for the sanding pad, as desired. It should be appreciated that where the sanding process may result undesirable scratch marks, such marks can be remedied through a subsequent polishing process.

In certain embodiments, the pad 116 can include a polishing pad, and working the predetermined amount 124 of the atomized composition 122 on the paint defect 104 of the part 102 can include polishing the paint defect 104 with the polishing pad and the atomized composition 122. Desirably, this can permit repairing the paint defect 104 where the paint defect 104 includes visual artifacts. The visual artifacts can include at least one of scratches, swirls, oxidation, dirt, and/or other minor imperfections. Although it should be appreciated that other defects, which can be cured by polishing, can also be handled by the polishing pad and the atomized composition 122. In addition, it should be appreciated that the polishing pad may not include an abrasive and/or grit.

Referring back to FIG. 7, in operation with the polishing pad, the end effector 114 can polish the paint defect 104 of the part 102 with the polishing pad and the atomized composition 122, such as the polishing composition, to remove thin layers of a top portion of the layer of paint, thereby repairing the paint defect 104 of the part 102. Polishing can include rotating, rubbing, oscillating, and/or vibrating the polishing pad with the atomized composition 122 against the paint defect 104 of the part 102. Non-limiting examples of the polishing pad can include fabrics, rotary polishing tools, fixed orbital polishing tools, random orbital polishing tools, and/or dual action forced rotation polishing tools. It should be appreciated that a person skilled in the art can employ different technologies for the polishing pad, as desired.

With reference to FIG. 1, the computer module 110 can be in communication with the robotic applicator 108 and/or the means for identifying the paint defect 106 of the part 102. This can be accomplished via wireless connections, wired connections, or through a network 138. It should be appreciated that the network 138 of the system 100 can include various wireless and wired communication networks, including a radio access network, such as LTE or 5G, a local area network (LAN), a wide area network (WAN) such as the Internet, or wireless LAN (WLAN), as non-limiting examples. It will be appreciated that such network examples are not intended to be limiting, and that the scope of this disclosure includes implementations in which one or more computing platforms of the system 100 can be operatively linked via some other communication coupling, including combinations of wireless and wired communication networks. One or more components and subcomponents of the system 100 can be configured to communicate with the networked environment via wireless or wired connections. In certain embodiments, one or more computing platforms can be configured to communicate directly with each other via wireless or wired connections. Examples of various computing platforms and networked devices include, but are not limited to, smartphones, wearable devices, tablets, laptop computers, desktop computers, Internet of Things (IoT) devices, or other mobile or stationary devices such as standalone servers, networked servers, or an array of servers.

While still referring to FIG. 1, the computer module 110 can be configured to control the functions of the robotic applicator 108. For example, the computer module 110 can be configured to direct the robotic applicator 108 to position the dispenser 112 and the pad 116 adjacent to the paint defect 104 of the part 102. In certain examples, the computer module 110 can be configured to interface with the means for identifying the paint defect 106 of the part 102 to more accurately direct the robotic applicator 108 to the paint defect 104 of the part 102. Another example can include the computer module 110 being configured to engage the dispenser 112 to atomize the composition 120 into the atomized composition 122 and dispose the predetermined amount 124 of the atomized composition 122 on the paint defect 104 of the part 102. As a further example, the computer module 110 can be configured to direct the end effector 114 to work the predetermined amount 124 of the atomized composition 122 and the paint defect 104 of the part 102 with the pad 116. The computer module 110 can have a processor 140 and a memory 142. The memory 142 can include non-transitory processor-executable instructions 144, which can control the functions of the robotic applicator 108. In certain examples, the computer system 100 can include a software platform. An operator can interface the software platform to manually adjust and control aspects of the robotic applicator 108. It should be appreciated that a skilled artisan can employ different features for the computer module 110, as desired.

Now referencing FIG. 6, the system 100 can also include a pump 146, at least one composition regulator 148, a gas regulator 150, and a dispenser control module 152. The pump 146 can be in communication with the composition supply 126. The pump 146 configured to move the composition 120 from the composition supply 126 via mechanical actions from the pump 146 to the dispenser 112. A non-limiting example of the pump 146 can include the CheckMate pumps commercially available from Graco Inc. It should be appreciated that a skilled artisan can select different technologies for the pump 146, as desired. The composition regulator 148 can be configured to regulate the pressure of the composition 120. In certain embodiments, the at least one composition regulator 148 can include a pump composition regulator 154 and an end-of-arm-tooling (EOAT) regulator 158. The pump composition regulator 154 can be in communication with the pump 146 and the dispenser 112. The pump composition can be configured to regulate a pressure of the composition 120 coming from the pump 146. The pump composition regulator 154 in combination with the pump 146 and the gas 130 from the gas supply 128 can regulate the pressure of the composition 120 to the dispenser 112 to be atomized. The EOAT regulator 158 can be in communication with the pump composition regulator 154, the dispenser 112, and the gas supply 128. The EOAT regulator 158 can be configured to regulate the pressure of the composition 120 coming from the pump composition regulator 154 to the dispenser 112. Desirably, the pump composition regulator 154 and the EOAT regulator 158 can be adjusted by the operator to adjust the pressure of the composition 120 coming to the dispenser 112 to be atomized. A non-limiting example of the pump composition regulator 154 can include the composition regulators 148 with the part number 74151-11 commercially available from Carlisle Composition Technologies. It should be appreciated that one skilled in the art can select different technologies for the pump composition regulator 154, within the scope of this disclosure. In addition, it should be appreciated that a person skilled in the art can add or remove the composition regulators 148, as appropriate for the given application.

While still referring to FIG. 6, the gas regulator 150 can be in communication with the gas supply 128 and the pump composition regulator 154. The gas regulator 150 can be configured to adjust the gas 130 being supplied to the pump composition regulator 154. Desirably, this can allow the operator to fine tune the pressure of the gas 130 going into the pump composition regulator 154. The dispenser control module 152 can be configured to control various aspects of the dispenser 112. For example, the dispenser control module 152 can be configured to assist in maintaining the pressure of the atomized composition 122. In certain embodiments, the dispenser control module 152 can include a composition control pilot unit 160. The composition control pilot unit 160 can be in communication with the gas supply 128 and the EOAT regulator 158. The composition control pilot unit 160 can be configured to act as secondary regulator, which can provide additional control to the EOAT regulator 158, improving overall sensitivity and accuracy.

With reference to FIGS. 2 and 6, the dispenser control module 152 can be configured to adjust a spray pattern of the atomized composition 122 as it is disposed from the dispenser 112. In certain embodiments, the dispenser control module 152 can include a shaping gas unit 162. The shaping gas unit 162 can be in communication with the gas supply 128 and the dispenser 112. The shaping gas unit 162 can be configured to adjust the pressure of the gas 130 going into the dispenser 112 for the purpose of adjusting the spray pattern and how the composition 120 gets atomized. The dispenser control module 152 can be further configured to control when the dispenser 112 dispenses the predetermined amount 124 of the atomized composition 122. In certain embodiments, the dispenser control module 152 can include a pneumatic trigger 164. The pneumatic trigger 164 can be in communication with the gas supply 128 and the dispenser 112. The pneumatic trigger 164 can be configured to direct the dispenser 112 to dispose the predetermined amount 124 of atomized composition 122 on the paint defect 104 of the part 102. It should be appreciated that a skilled artisan can add or remove features from the dispenser control module 152, as required by the given application.

In certain examples, the robotic applicator 108 can also include a waste remover (not shown). The robotic applicator 108 can be configured to position the waste remover adjacent to the paint defect 104. The waste remover can be configured to remove excess waste from the sanding process and/or the polishing process. The excess waste can include excess polish, water, particles, clear coat, and/or paint swarf. Non-limiting examples of the waste remover or wiper can include fabric, a brush, a blowing operation, a vacuum operation, etc. It should be appreciated that one skilled in the art can select different technologies for the waste remover, as appropriate for the given application.

In certain embodiments, the dispenser 112 can include a sanding dispenser and a polishing dispenser, and the pad 116 can include the sanding pad and the polishing pad. The sanding dispenser can be configured to atomize the sanding composition into the atomized sanding composition and dispose the predetermined amount 124 of the atomized sanding composition on the paint defect 104. The sanding pad can be configured to sand the predetermined amount 124 of the atomized sanding composition and on the paint defect 104. The polishing dispenser can configure to atomize the polishing composition into the atomized polishing composition and dispose the predetermined amount 124 of the atomized polishing composition on the paint defect 104. The polishing pad can be configured to polish the predetermined amount 124 of the atomized polishing composition on the paint defect 104. Advantageously, with this configuration, the robotic applicator 108 can perform the sanding process and the polishing process.

Now referencing FIG. 7, the system 100 can include a second robotic applicator 108'. The second robotic applicator 108' can be similar or identical to the robotic applicator 108. In certain examples, the robotic applicator 108 can have the sanding dispenser and the end effector 114 with the sanding pad, while the second robotic applicator 108' has the polishing dispenser and another end effector with the polishing pad. Desirably, with this configuration, the robotic applicator 108 can perform the sanding process and the second applicator 108' can perform the polishing process.

Figure 8:
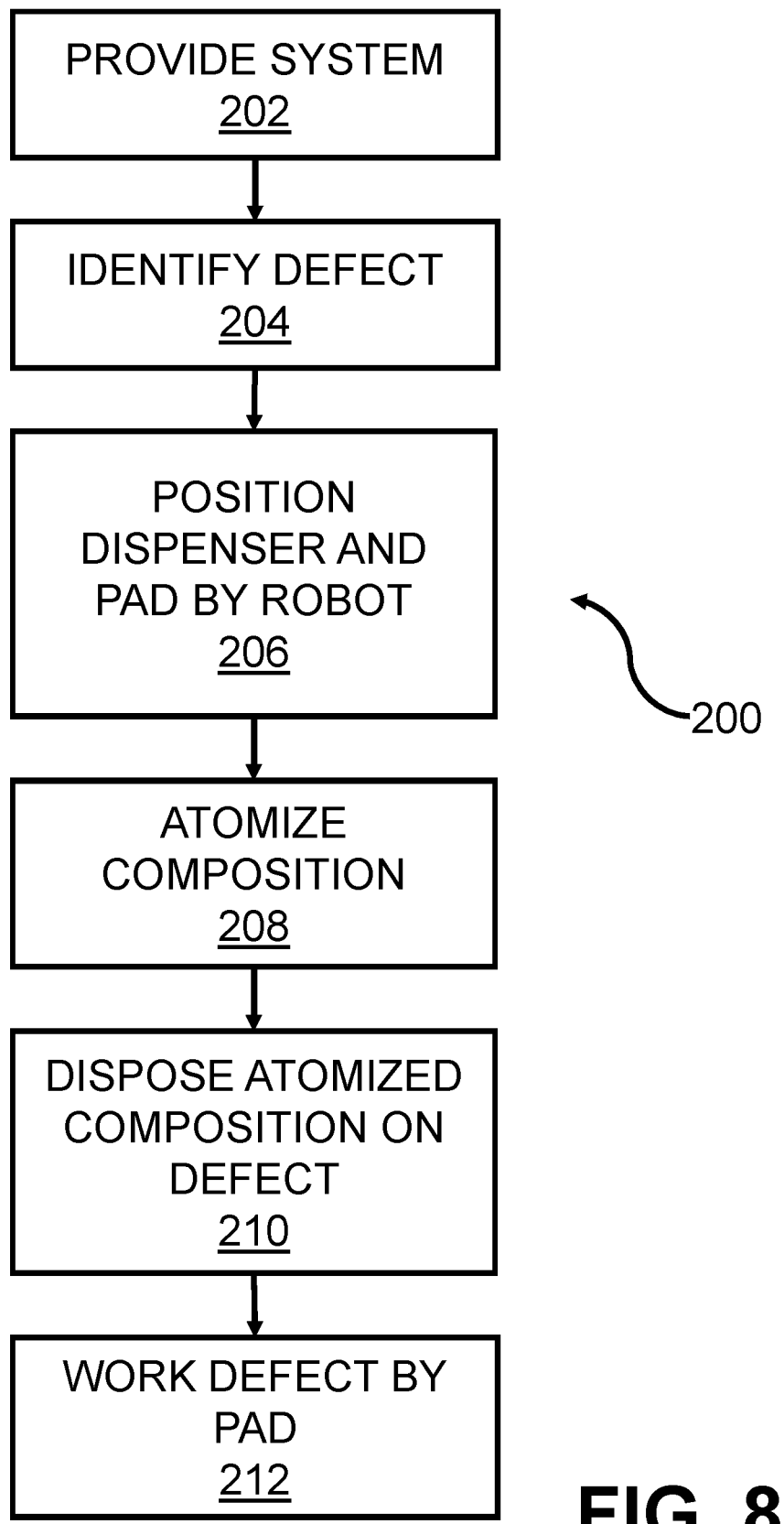
FIG. 8 is a flowchart showing a method for repairing the paint defect of the part, according to certain embodiments, the method using a system having the robotic applicator.

With reference to FIG. 8, an embodiment of a method 200 for repairing a paint defect 104 of a part 102 is shown. The method 200 can have a step 202 of providing the system 100, including the robotic applicator 108 with the dispenser 112 and the pad 116. In a step 204, the paint defect 104 can be identified by the means for identifying the paint defect 106. This can be accomplished using a variety of the systems and methods identified hereinabove. The robotic applicator 108 can position the dispenser 112 and the pad 116 adjacent to the paint defect 104 of the part 102, in a step 206. In a step 208, the dispenser 112 can atomize the composition 120 into the atomized composition 122. In certain instances, such as the sanding process, the composition 120 can include the sanding composition. In other instances, including the polishing process, the composition 120 can include the polishing composition. The dispenser 112 can dispose the predetermined amount 124 of the atomized composition 122 on the paint defect 104, in a step 210. In a step 212, the end effector 114 can work the atomized composition 122 on the paint defect 104 with the pad 116, thereby repairing the paint defect 104 of the part 102. In certain operations, such as the sanding process, working the atomized composition 122 on the paint defect 104 can include sanding the paint defect 104 with the atomized composition 122 and the pad 116. In other operations, including the polishing process, working the atomized composition 122 on the paint defect 104 can include polishing the paint defect 104 with the atomized composition 122 and the pad 116.

Figure 9:
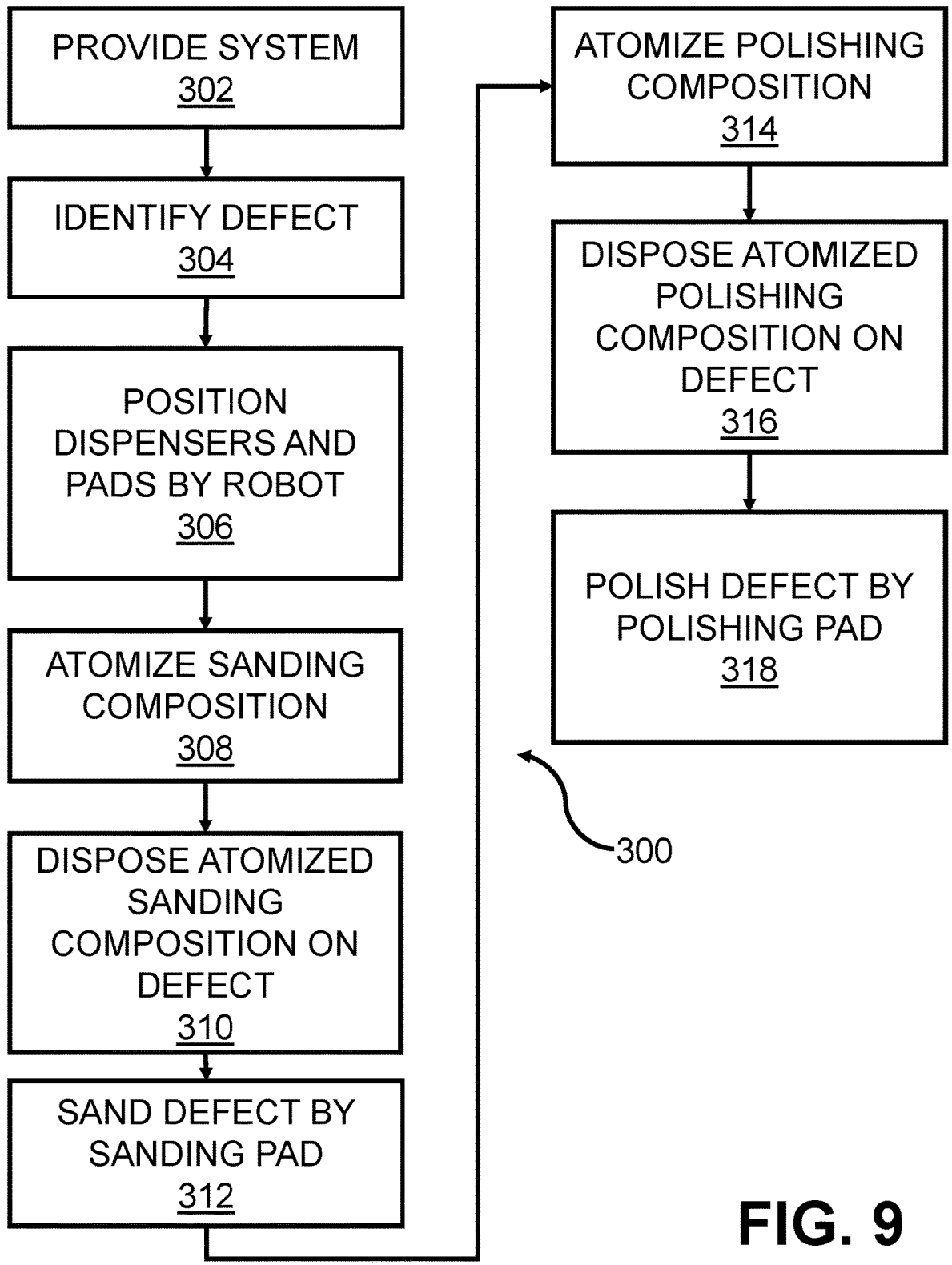
FIG. 9 is a flowchart showing another method for repairing the paint defect of the part, according to certain embodiments, using a system having the robotic applicator with the dispenser, the another dispenser, the pad, and another pad.

As shown in FIG. 9, another method 300 of repairing a paint defect 104 of a part 102 is shown. The method 300 can include a step 302 of providing the system 100, including the robotic applicator 108 with the sanding dispenser, the polishing dispenser, the sanding pad, and the polishing pad. In a step 304, the paint defect 104 can be identified by the means for identifying the paint defect 106. This can be accomplished using a variety of the systems and methods identified hereinabove. The robotic applicator 108 can position the sanding dispenser, the polishing dispenser, the sanding pad, and the polishing pad adjacent to the paint defect 104 of the part 102, in a step 306. In a step 308, the sanding dispenser can atomize the sanding composition into the atomized sanding composition. The sanding dispenser can dispose the predetermined amount 124 of the atomized sanding composition on the paint defect 104, in a step 310. In a step 312, the end effector 114 can sand the paint defect 104 with atomized sanding composition and the sanding pad. The polishing dispenser can atomize the polishing composition into the atomized polishing composition, in a step 314. In a step 316, the polishing dispenser can dispose the predetermined amount 124 of the atomized polishing composition on the paint defect 104. In a step 318, the end effector 114 can polish the paint defect 104 with the atomized polishing composition and the polishing pad, thereby repairing the paint defect 104 of the part 102.

Figure 10:
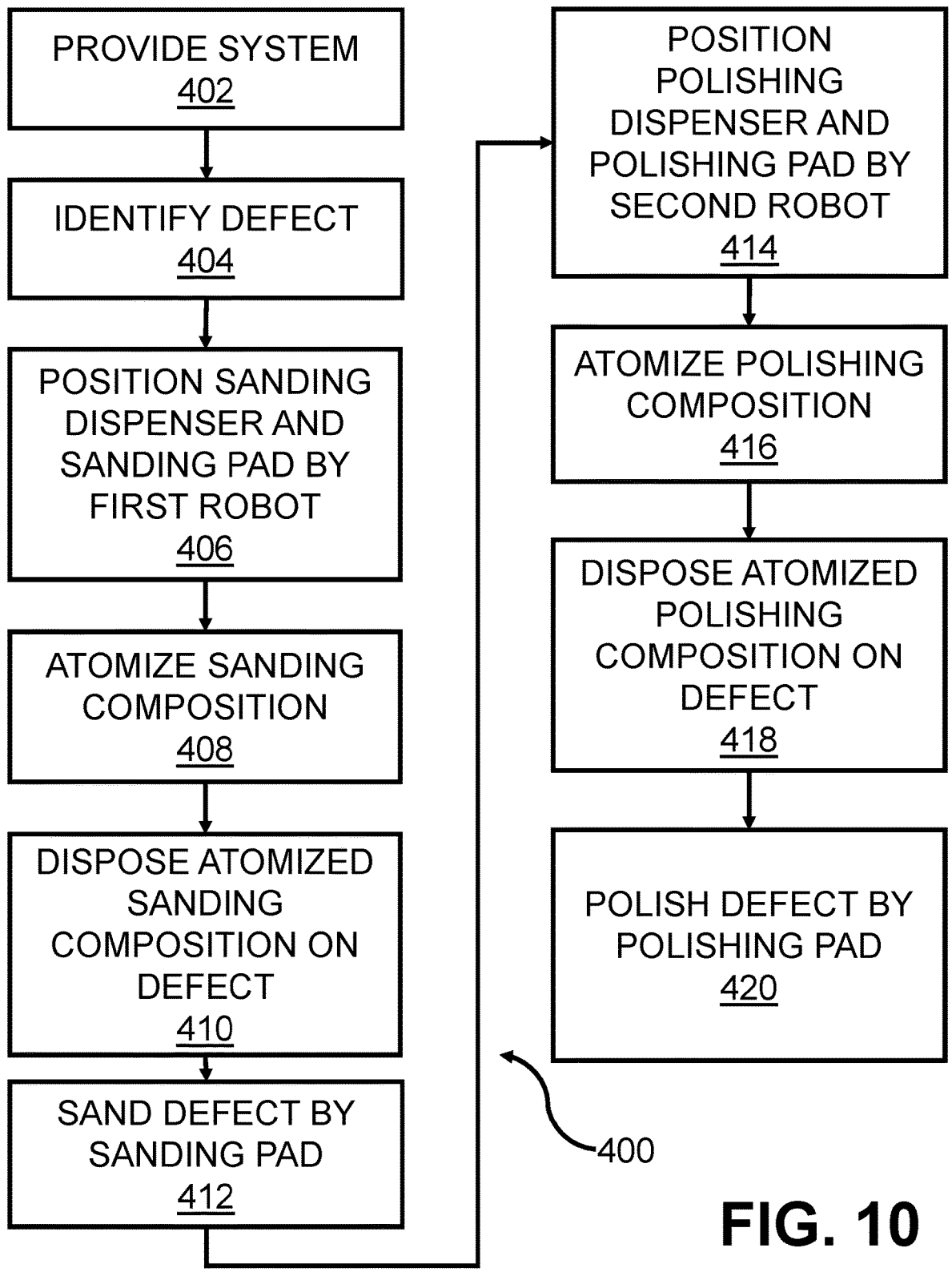
FIG. 10 is a flowchart showing yet another method for repairing the paint defect of the part, according to certain embodiments, using a system having the robotic applicator and the second robotic applicator.

Now referring to FIG. 10, yet another method 400 of repairing a paint defect 104 of a part 102 is shown. The method 400 can include a step 402 of providing the system 100, including the second robotic applicator 108'. In a step 404, the paint defect 104 can be identified by the means for identifying the paint defect 106. The robotic applicator 108 can position the sanding dispenser and the sanding pad adject to the paint defect 104 of the part 102, in a step 406. In a step 408, the sanding dispenser can atomize the sanding composition into the atomized sanding composition. The sanding dispenser can dispose the predetermined amount 124 of the atomized sanding composition on the paint defect 104 of the part 102, in a step 410. In a step 412, the end effector 114 can sand the paint defect 104 with the atomized sanding composition and the sanding pad. The second robotic applicator 108' can position the polishing dispenser and the polishing pad adject to the paint defect 104 of the part 102, in a step 414. In a step 416, the polishing dispenser can atomize the polishing composition into the atomized polishing composition. The polishing dispenser can dispose the predetermined amount 124 of the atomized polishing composition on the paint defect 104, in a step 418. In a step 420, another end effector can polish the paint defect 104 with the atomized polishing composition and the polishing pad, thereby repairing the part 102.

Figure 12:
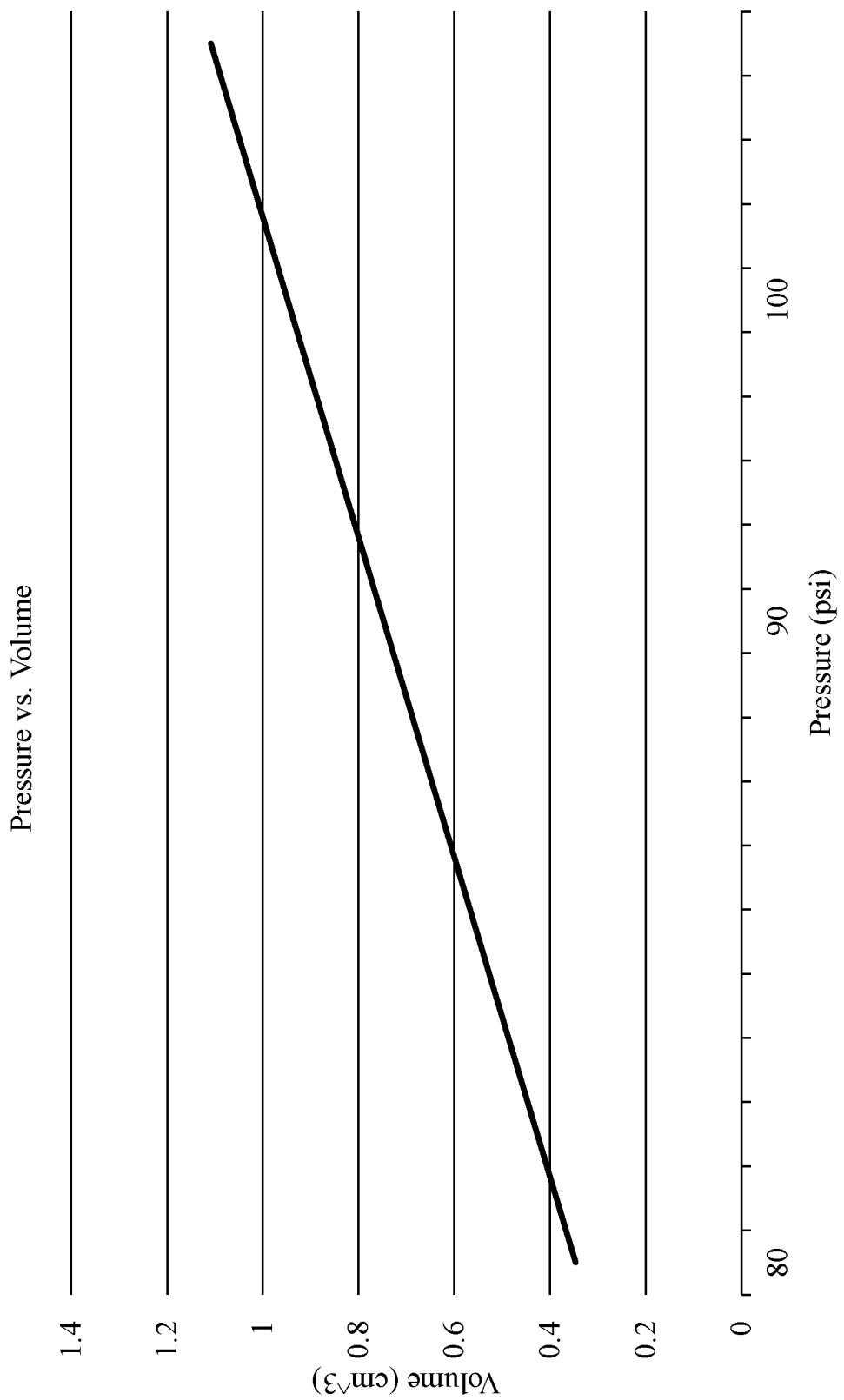
FIG. 12 is graph showing the linear relationship between the dispense pressure and the volume of the composition dispensed.

With reference to FIGS. 11-12, trials of a system 100 constructed in accordance with the present technology were conducted to determine a volume of composition 120 dispensed when a dispense pressure was varied, resulting in the linear relationship between the dispense pressure and the volume of composition 120 dispensed, as shown. The composition 120 was dispensed at a set time period of 0.3 seconds and the composition 120 was polish-based.

Advantageously, the various systems 100 and methods 200, 300, and 400 provided by the present technology can repair one or more paint defects 104 of one or more part 102. As mentioned above, this can include the sanding process and/or the polishing process using one or more robotic applicators 108. In addition, atomizing the compositions employed permits controlled and repeatable amounts of material to be applied to each paint defect 104, while militating against wasted material.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments can be embodied in many different forms, and that neither should be construed to limit the scope of the disclosure. In some example embodiments, well-known processes, well-known device structures, and well-known technologies are not described in detail. Equivalent changes, modifications and variations of some embodiments, materials, compositions, and methods can be made within the scope of the present technology, with substantially similar results.

What is claimed is:

1. A system for repairing a paint defect of a part, comprising:
   means for identifying the paint defect of the part;
   a composition supply including a composition selected from a sanding composition and a polishing composition, the sanding composition and the polishing composition including a paste having an abrasive grit;
   a robotic applicator having a dispenser and an end effector with a pad, the end effector configured to control motion of the pad, the robotic applicator configured to position the dispenser and the pad adjacent to the paint defect of the part, the dispenser configured to atomize the composition into an atomized composition and dispose a predetermined amount of the atomized composition on the paint defect, and the end effector configured to work the predetermined amount of the atomized composition on the paint defect of the part with the pad; and
   a computer module in communication with the robotic applicator, the computer module configured to control the robotic applicator.

2. The system of claim 1, wherein the means for identifying the paint defect of the part includes an object inspection system.

3. The system of claim 1, wherein the composition includes a sanding composition and the pad includes a sanding pad.

4. The system of claim 3, further comprising:
   another robotic applicator having another dispenser and another end effector with another pad, the another end effector configured to control motion of the another pad, the another robotic applicator configured to position the another dispenser and the another pad adjacent to the paint defect of the part, the another dispenser configured to atomize another composition into another atomized composition and dispose another predetermined amount of the another atomized composition on the paint defect, and the another end effector configured to work the another predetermined amount of the another atomized composition on the paint defect of the part with the pad,
   wherein the another composition includes a polishing composition and the another pad includes a polishing pad.

5. The system of claim 1, wherein the composition includes a polishing composition and the pad includes a polishing pad.

6. The system of claim 1, wherein the dispenser is in communication with the composition supply and a gas supply.

7. The system of claim 6, further comprising a pump, a composition regulator, a gas regulator, and a dispenser control module, the pump and the composition regulator in communication with the composition supply and the gas regulator in communication with the gas supply.

8. The system of claim 1, wherein the dispenser includes a nozzle having a composition outlet and a gas outlet disposed adjacent to one another on the nozzle.

9. A method for repairing a paint defect of a part, comprising:
   providing a system for repairing the paint defect of the part, the system comprising means for identifying the paint defect of the part;
   a composition supply including a composition selected from a sanding composition and a polishing composition, the sanding composition and the polishing composition including a paste having an abrasive grit;
   a robotic applicator comprising a dispenser and an end effector with a pad, the end effector configured to control motion of the pad;
   and a computer module in communication with the robotic applicator and configured to control the robotic applicator,
   identifying the paint defect of a part using the means for identifying the paint defect of the part;
   positioning by the robotic applicator the dispenser and the pad adjacent to the paint defect of the part;
   atomizing by the dispenser the composition into an atomized composition;
   disposing by the dispenser a predetermined amount of the atomized composition on the paint defect;
   and working by the end effector the predetermined amount of atomized composition on the paint defect of the part with the pad, thereby repairing the paint defect of the part.

10. The method of claim 9, wherein the means for identifying the paint defect of the part includes an object inspection system.

11. The method of claim 9, wherein the dispenser is configured to atomize the composition into the atomized composition and dispose the predetermined amount of the atomized composition on the paint defect such that an adhesive force of the atomized composition on the paint defect is substantially greater than gravity, thereby minimizing movement of the atomized composition on the paint defect.

12. The method of claim 9, wherein the composition includes a sanding composition and the pad includes a sanding pad, and working the predetermined amount of atomized composition on the paint defect includes sanding, by the end effector, the predetermined amount of atomized sanding composition on the paint defect of the part with the sanding pad.

13. The method of claim 12, wherein the robotic applicator further includes another dispenser and another pad, and wherein the another pad includes a polishing pad.

14. The method of claim 13, wherein the positioning, by the robotic applicator, the dispenser and pad adjacent to the paint defect of the part also includes positioning the another dispenser and the polishing pad.

15. The method of claim 14, wherein the method includes atomizing, by the another dispenser, a polishing composition into an atomized polishing composition; disposing, by the another dispenser, a predetermined amount of the atomized polishing composition;
   polishing, by the end effector, the paint defect with the predetermined amount of the atomized polishing composition and the polishing pad.

16. The method of claim 12, wherein the system further comprises:
   another robotic applicator having another dispenser and another end effector with another pad, the another end effector configured to control motion of the another pad, and wherein the another pad includes a polishing pad.

17. The method of claim 16, wherein the method includes:
   positioning, by the another robotic applicator, the another dispenser and the polishing pad adjacent to the paint defect of the part;
   atomizing, by the polishing dispenser a polishing composition into an atomized polishing composition;

disposing, by the polishing dispenser, a predetermined amount of the atomized polishing composition on the paint defect; and polishing, by the another end effector pad, the paint defect with the predetermined polishing composition and the polishing pad.

18. The method of claim 9, wherein the composition includes a polishing composition and the pad includes a polishing pad, and working the predetermined amount of atomized composition on the paint defect includes polishing, by the end effector, the predetermined amount of atomized polishing composition on the paint defect of the part with the polishing pad.

19. The method of claim 9, wherein the part is being transported by a production or assembly line, and the robotic applicator is configured to maintain the dispenser and the pad adjacent to the paint defect of the part as the part is continuously being moved by the assembly line.

* * * * *